(12) United States Patent
Chorley et al.

(10) Patent No.: US 8,170,899 B2
(45) Date of Patent: May 1, 2012

(54) SUPPLY CHAIN RESERVATION

(75) Inventors: Jon S. Chorley, Mill Valley, CA (US); Milan Bhatia, San Mateo, CA (US)

(73) Assignee: Oracle International Corporation, Redwood Shores, CA (US)

(*) Notice: Subject to any disclaimer, the term of this patent is extended or adjusted under 35 U.S.C. 154(b) by 0 days.

(21) Appl. No.: 10/158,175

(22) Filed: May 29, 2002

(65) Prior Publication Data

US 2003/0233262 A1 Dec. 18, 2003

(51) Int. Cl.
*G06Q 10/00* (2012.01)
(52) U.S. Cl. ...................................... 705/7.22
(58) Field of Classification Search .............. 705/8, 7, 705/1, 7.22
See application file for complete search history.

(56) References Cited

U.S. PATENT DOCUMENTS

| | | | | |
|---|---|---|---|---|
| 5,101,352 A * | 3/1992 | Rembert | | 705/8 |
| 5,369,570 A * | 11/1994 | Parad | | 705/8 |
| 5,594,639 A * | 1/1997 | Atsumi | | 700/107 |
| 5,712,989 A * | 1/1998 | Johnson et al. | | 705/28 |
| 5,923,552 A * | 7/1999 | Brown et al. | | 700/100 |
| 5,936,860 A * | 8/1999 | Arnold et al. | | 700/95 |
| 5,946,662 A * | 8/1999 | Ettl et al. | | 705/8 |
| 5,971,585 A * | 10/1999 | Dangat et al. | | 700/102 |
| 5,983,194 A * | 11/1999 | Hogge et al. | | 705/7 |
| 6,157,915 A * | 12/2000 | Bhaskaran et al. | | 705/7 |
| 6,282,550 B1 * | 8/2001 | Venkatesan et al. | | 707/104 |
| 6,393,332 B1 * | 5/2002 | Gleditsch et al. | | 700/99 |
| 6,463,345 B1 * | 10/2002 | Peachey-Kountz et al. | | 700/99 |
| 6,477,660 B1 * | 11/2002 | Sohner | | 714/1 |
| 6,564,226 B1 * | 5/2003 | Dickson et al. | | 707/104.1 |
| 6,577,304 B1 * | 6/2003 | Yablonski et al. | | 345/419 |
| 6,587,827 B1 * | 7/2003 | Hennig et al. | | 705/1 |
| 6,591,243 B1 * | 7/2003 | Grettve et al. | | 705/8 |
| 6,701,201 B2 * | 3/2004 | Hegde et al. | | 700/107 |
| 6,889,197 B2 * | 5/2005 | Lidow | | 705/10 |
| 7,058,587 B1 * | 6/2006 | Horne | | 705/7 |
| 7,313,539 B1 * | 12/2007 | Pappas et al. | | 705/35 |
| 2002/0143692 A1 * | 10/2002 | Heimermann et al. | | 705/37 |

FOREIGN PATENT DOCUMENTS

WO WO 03/102734 A2 12/2003

OTHER PUBLICATIONS

International Search Report for PCT Application No. PCT/US03/017160, mailed on Mar. 10, 2004; 8 pages.
Written Opinion for PCT Application No. PCT/US03/017160, mailed on May 20, 2004; 4 pages.
Office Action dated Jan. 13, 2009 for Chinese Patent Application No. 03812324.X, 11 pages.
Office Action dated Jul. 8, 2009 for Chinese Patent Application No. 03812324.X, 11 pages.
Notice of Reexamination dated Sep. 14, 2011 for Chinese Patent Application No. 03812324.X, 4 pages.

* cited by examiner

*Primary Examiner* — Johnna Loftis
(74) *Attorney, Agent, or Firm* — Kilpatrick Townsend & Stockton LLP

(57) ABSTRACT

A method for managing a supply chain which provides for mapping each demand and its respective source of supply. The method entails attaching a reservation between a demand and a supply. The reservation is updated as the status of the source of supply changes. As a result, the user has complete visibility for modeling the entire supply chain as material moves from one location to another.

34 Claims, 7 Drawing Sheets

SUPPLY CHAIN RESERVATION

FIELD OF THE INVENTION

The present invention relates to management of a supply chain, and more particularly to a system for reserving a source of supply for a demand.

BACKGROUND OF THE INVENTION

To achieve optimal performance, entities want to be able to continuously reduce inventory, while still having enough to satisfy every demand at any given time. Supply chain management is the concept utilized to minimize overhead, maximize performance while timely and efficiently meeting all demands. Supply chain management looks at all the things that one needs to do to control the business process across the entire supply chain.

When managing a supply chain, one needs to know such things as how much quantity is needed on hand of an item to supply any given demand. This requires knowing the supplier's lead time, knowing the transportation options, how long it takes to get the item, how much it costs, how fast it is sold or used, and the like. For example, one may know how many memory chips are currently on hand. However, to optimize performance, one needs to know how many, of a particular speed, latency and capacity, will be available from one's supplier in two days so that one can meet their demands next week.

The prior art allows the user to see a peg between a specific purchase order and production job, or requisition and receiving slip, or the like. However, no system currently allows the user to link all the peggings together to see a complete end-to-end pegging scenario. The inability to obtain a complete pegging scenario results in inefficiencies. For example, a requisition may peg a demand for a component to the component received from a vendor. However, someone must decide who gets the component and for what job, the work order, whether to route the item to an inventory location or manufacturing location, and the like. Current methods also do not provide sufficient granular details. Therefore, decision makers do not readily have information necessary to make the best decision possible. Without a complete end-to-end pegging, the supply chain is subject to contentions between competing demands. Furthermore, current methods are not effective for scheduling tasks and materials. Thus the need exists to be able to create a complete end-to-end pegging scenario.

SUMMARY OF THE INVENTION

The present invention comprises a supply chain reservation system for providing a complete end-to-end pegging scenario. The present invention provides a solution for managing allocations across a supply chain. The present invention is readily configurable by the user to model all transaction types that make up a supply chain.

In one embodiment, the present invention is fully architected and partially implemented as a supply chain reservation system that identifies a source of demand and identifies a source of supply to satisfy the demand. A reservation is utilized to link the source of demand with the source of supply. If the source of supply is not available, then the source of supply also constitutes another demand in the reservation system. The process then continues by identifying a source of supply to satisfy each further demand. Reservations are utilized to link the respective sources of demand with the sources of supply. The process continues until an available source of supply is located.

In so doing, the supply chain reservation system can provide a complete end-to-end mapping of the supply chain being modeled. The end-to-end mapping provides visibility and traceability. The supply chain reservation system also provides for the seamless transfer of reservations along the supply chain as material moves along the supply chain. The reservation system can eliminate contentions throughout the supply chain. The reservation system also provides the content for possibly scheduling tasks and resources throughout the supply chain. Such features can provide improved just-in-time inventory management throughout the user's enterprise.

BRIEF DESCRIPTION OF THE DRAWINGS

The present invention is illustrated by way of example and not by way of limitation, in the figures of the accompanying drawings and in which like reference numerals refer to similar elements and in which.

DETAILED DESCRIPTION OF THE INVENTION

Reference will now be made in detail to the embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail as not to unnecessarily obscure aspects of the present invention.

The present invention provides a method and system for implementing an automated supply chain management system. The supply chain reservation system models a supply chain by the generic concept of matching supply to demand.

Thereafter, creating a reservation between the matching source of supply to the source of demand, provides a complete end-to-end mapping of the supply chain being modeled. The reservation can be seamlessly transferred along the supply chain as material moves along the supply chain. The reservation system provides traceability, visibility, eliminates contentions, and can be used to schedule task and materials throughout the supply chain. The present invention and its benefits are further described bellow.

Figure 1:
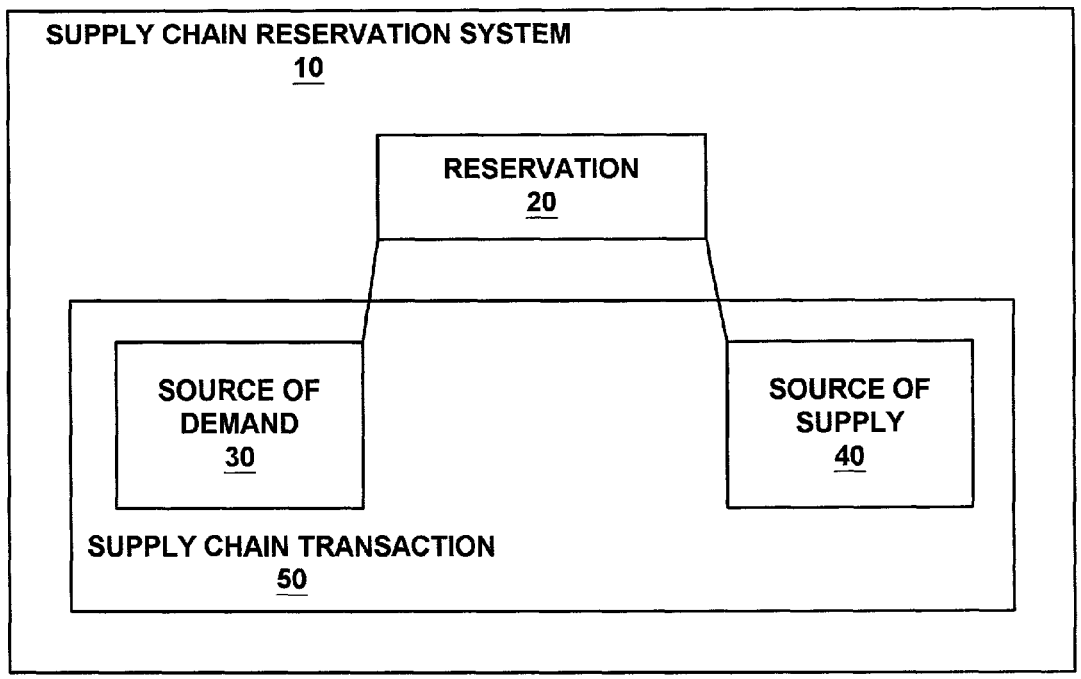
FIG. 1 shows a diagram of a supply chain reservation system, in accordance with one embodiment of the present invention.

Referring now to FIG. 1, a diagram of an automated supply chain reservation system 10 in accordance with one embodiment of the present invention is shown. As depicted in FIG. 1, a supply chain consists of at least one transaction 50, such as an assembly job, available raw material stock, or the like. Although the supply chain is made up of one or more different transaction types, each can be modeled as a source of demand 30 and a source of supply 40. The supply chain reservation system 10 models this generic concept of matching supply to demand by attaching a reservation 20 between the source of demand 30 and its source of supply 40.

The generic concept of matching supply to demand is leveraged, so that via these supply chain transactions, the system can continually update the status of how a particular source of demand 30 is going to be satisfied, as things progress (i.e. move from one place to another) through the supply chain. Updating the status of the reservation 20 allows it to move seamlessly as items progress through the system. Therefore, the reservation 20 provides visibility and traceability.

Figure 2:
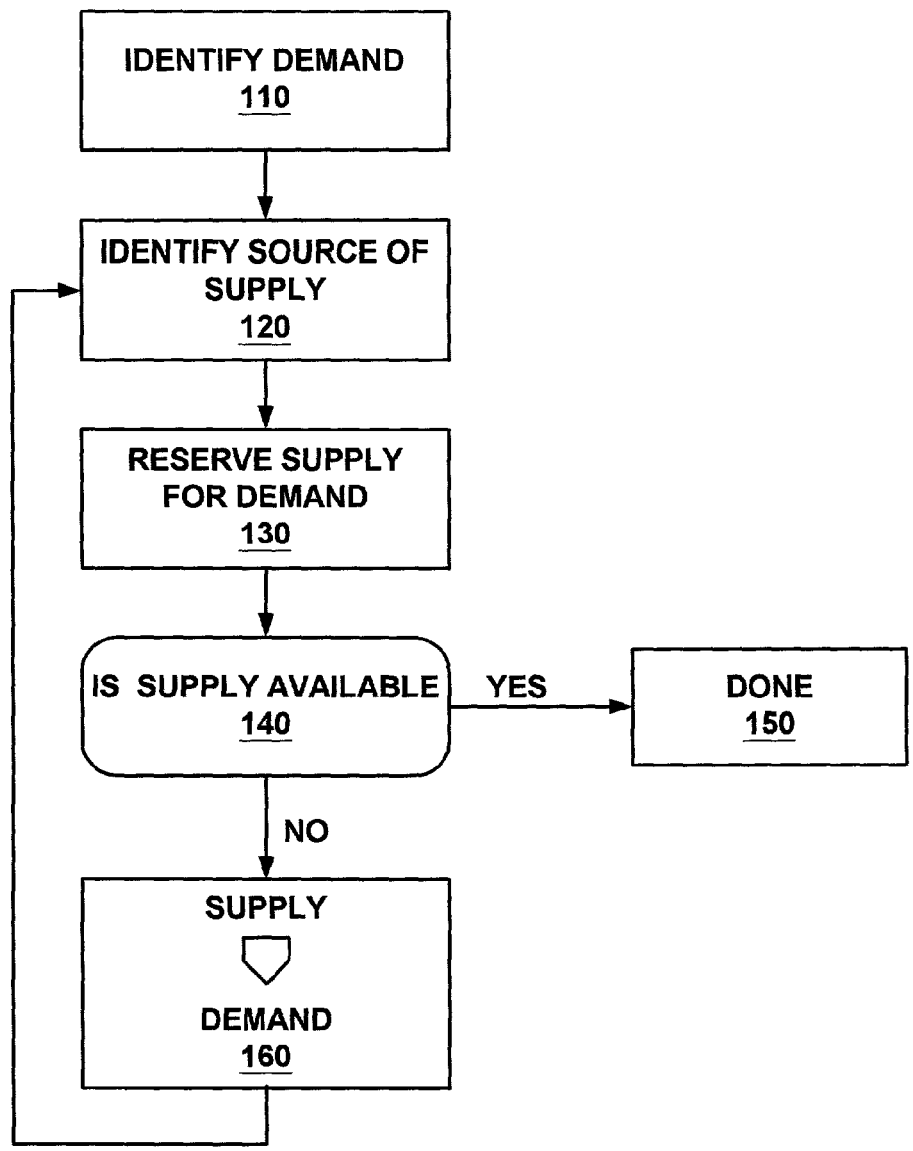
FIG. 2 shows a flow diagram of a supply chain reservation system, in accordance with one embodiment of the present invention.

FIG. 2 shows a process performed by a supply chain reservation system in accordance with an embodiment of the present invention. The process begins by determining a demand 110. A source of supply that is capable of satisfying the demand is then determined 120. The supply is reserved for the demand 130. If the supply is available 140, the process is done 150, and the supply is sourced to the demand upon request. However, if the supply is not currently available, then the supply also constitutes an additional demand 160. Hence, a currently unavailable supply is identified as an additional demand (e.g., the unavailable supply is equated to a new demand.

Figure 3:
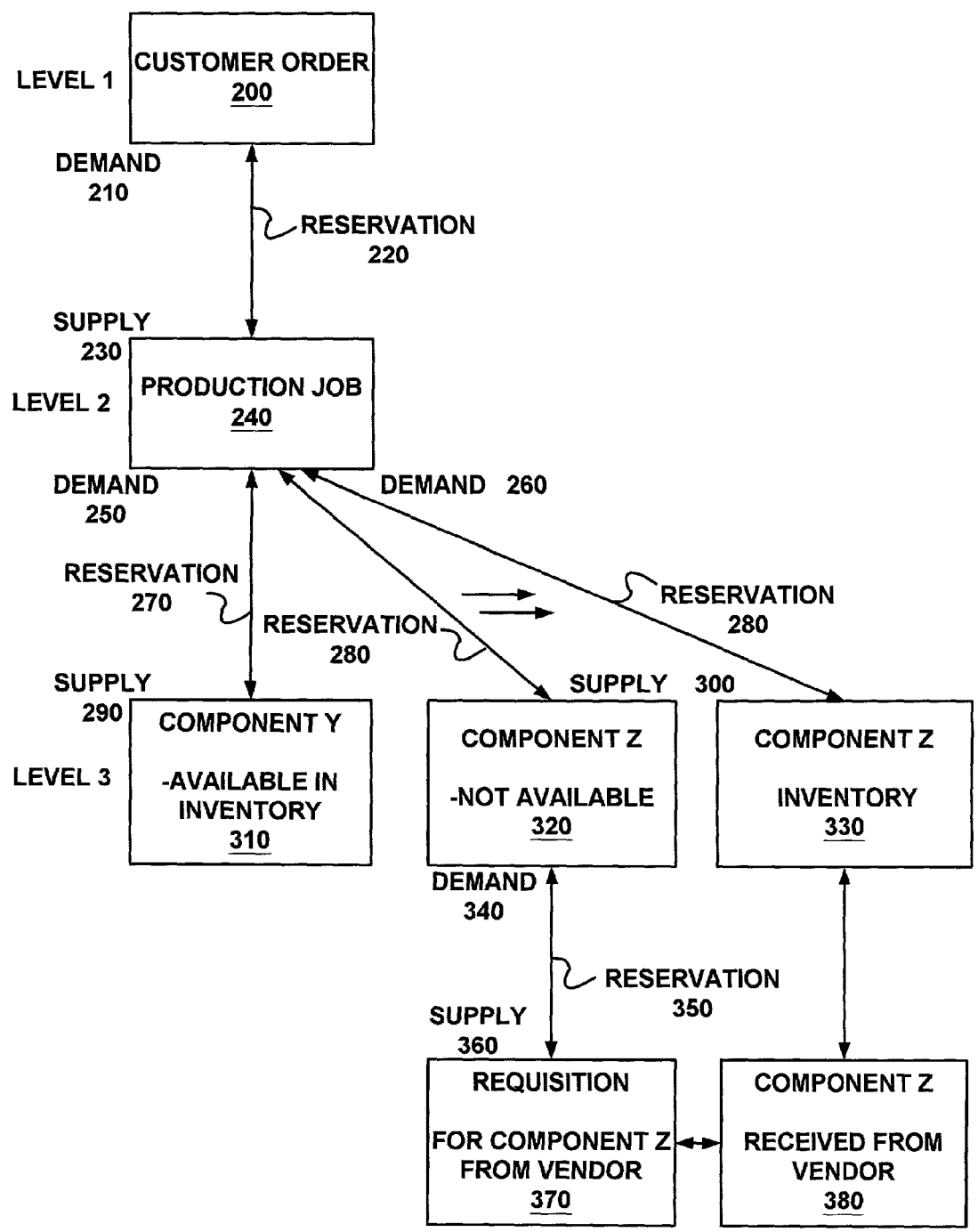
FIG. 3 shows a diagram of a supply chain reservation system applied in a manufacturing example, in accordance with an alternative embodiment of the present invention.

The process shown in FIG. 2 models a supply chain in which each task type has only one demand and one source of supply for each demand. However, in most supply chains a task type may have one or more demands, one or more sources, and or one or more supplies. For example in a simple manufacturing scenario, a company may sell a product which is assembled from components Y and Z. FIG. 3 illustrates a manufacturing supply chain for this manufacturing scenario. The supply chain includes a customer order 200 and a production job 240. The production job 240 requires two components Y 310 and Z 320.

When the manufacturer receives the customer order 200, a reservation system in accordance with another embodiment of the invention checks to see if the production job 240 is available to source the customer order 200. The reservation system then creates a reservation 220 that links the customer order 200, as a demand 210, to the production job 240, as a supply 230. The production job 240 also constitutes a demand 250 for a supply 290, component Y 310, and a demand 260 for another supply 300, component Z 320. Therefore a reservation 270 is attached between the demand 250 the source 290. Another reservation 280 is made between the demand 260 and the source 300.

An available supply is sourced to the demand upon request. However, if the supply is not available, the reservation system checks to see what are the different sources of supplies that can provide the component, for example is it a make or buy item.

If the manufacturer has component Y 310 in inventory but not component Z 320, the supply 290 is available while the supply 300 is not available. Because component Z 320 is not available, it also constitutes a demand 340. A requisition for the component Z from a vendor 370 is a intangible source of supply 360. The reservation system thus attaches a reservation between the demand 340 and the supply 360. When component Z is received from the vendor 380, component Z is placed in inventory 330 and the status of reservation 350 is updated to reflect that the demand 340 has been satisfied by the supply 360. Furthermore, reservation 280 is updated to reflect that component Z 330 is now a true supply and available for sourcing upon request. Thus the reservations 220, 270, 280, 350 are able to seamlessly reflect the status as material moves along the supply chain.

Figure 4:
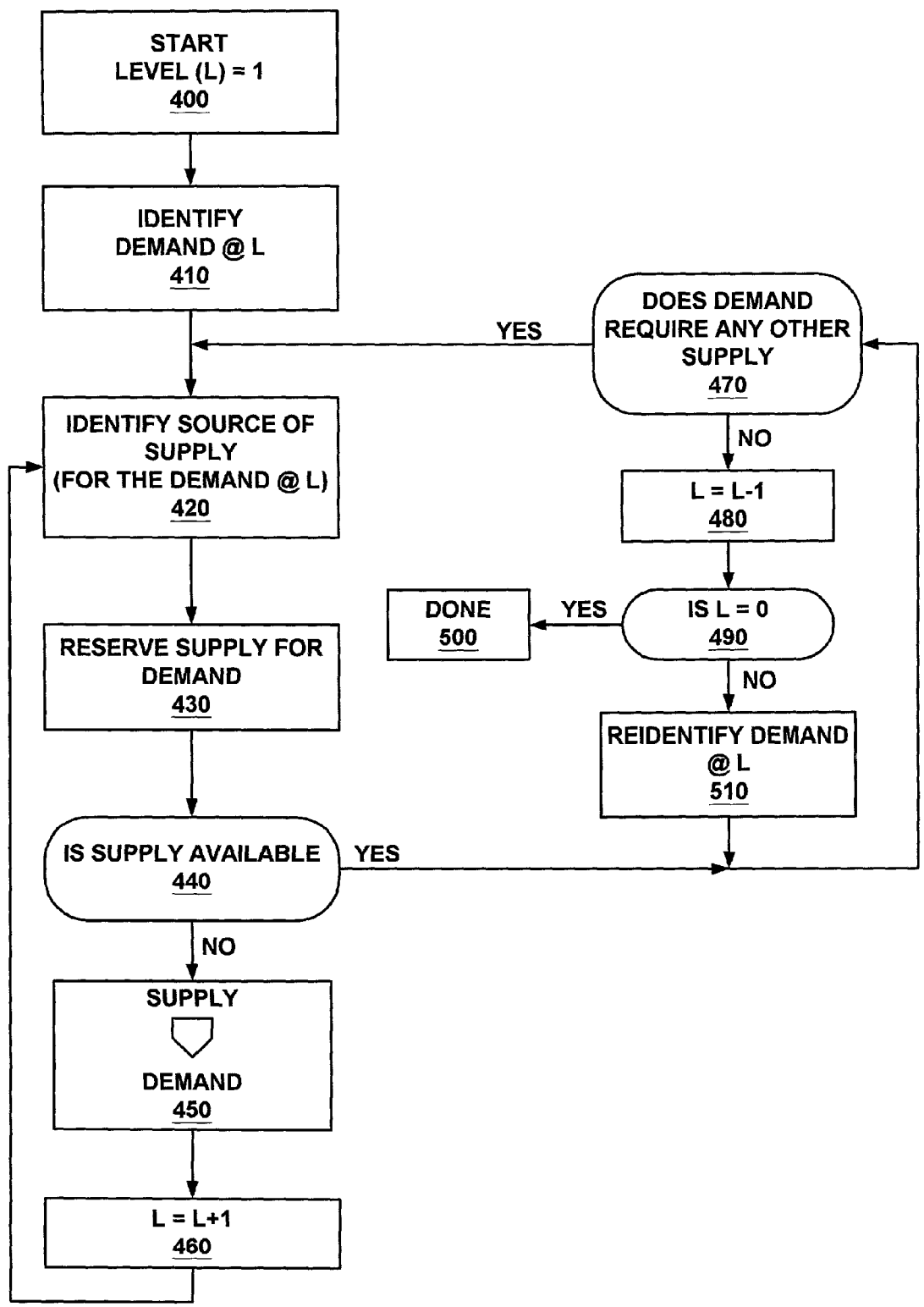
FIG. 4 shows a flow diagram of a supply chain reservation system, in accordance with an alternative embodiment of the present invention.

With reference now to FIG. 4, a flow chart of the steps of a supply chain reservation process in accordance with an embodiment of the present invention is shown. As depicted in FIG. 4, the operating steps provide for a reservation system in which a transaction type may consist of one or more demands that each need one or more sources of supply. The loop along the left maps the sequential demand-source-demand path. The nested loops along the right provides for mapping each sequential demand-source-demand path for multiple demands having one or more sources of supply.

The level counter is used to assist comprehension of the flow diagram. The level is used in the following description to assist the reader in keeping track of the node in the supply chain that the discussion is referring to. The level is not necessarily an element of the invention.

The process begins at an originating task type 400 (Level 1). A demand is determined 410 in the reservation system. A source of supply, for the demand, is then determined 420. The supply is reserved for the demand 430. If the supply is not available 440, the current supply is equated to a new demand (e.g., the unavailable supply becomes a demand 450). A source of supply to satisfy the new demand (for example at level 2) is then determined 420. The availability of the source is then tested again 440.

If the supply is available, it is determined whether the current demand requires another supply 470. If the current demand requires another supply 470, the source of supply is identified 420 and the process as described above is repeated.

If the current demand does not require another supply 470, the process moves back up a level (for example back to level 1 480) If there is no higher level 490, the process is done 500. Otherwise, the previous demand (for example at level 1) is re-identified 510.

Again it is determined whether the re-identified demand requires another supply 470. If another supply is not required, the process continues back up through the levels of demand as described above. If another supply is required, the process continues by identifying a source of supply 420, reserving the supply for the demand 430, and so on.

For example, referring to FIGS. 3 & 4, the customer order 200, can be considered the originating task type (at level 1 400). The customer order 200 is identified 410 as the demand 210. A source of supply 230, the production job 240, is then identified 420. The supply 230 is reserved 430 for the demand 210. The availability of the supply is then tested 440. Assuming that the supply 230, production job 240, is not available, the current supply 230 becomes 450 a demand 250. (The new demand 250 is at level 2 460).

A source of supply, for the demand 250 is then identified 420. For example, component Y 310 is identified as a supply 290. A reservation 430 is attached between the demand 250 and the supply 290. The availability of the supply 290 is tested 440. In the example, the component Y 310 is available in inventory. Therefore, the process continues by determining whether the demand 250 requires any other supply 470. For example, component Z 320 is identified 420 as a supply 300. Again a reservation 430 is attached between the demand 260 and the supply 300.

The availability of the supply 300 is tested 440. In the example, component Z 320 is not available. Therefore, the supply 300 becomes a demand 340. (The new demand 340 is at level 3 460).

A source of supply, for the demand 340 is then identified 420. A reservation 430 is attached between the demand 340 and the supply 360. In this case the requisition 370 constitutes an available intangible supply, because the supplier is outside the manufacturers supply chain. Therefore, when availability is tested 440, the process continues by determining if the demand 340 requires any other supply 470.

In this case the demand 340 does not require any other supply. Therefore, the process moves back up to level 2 480. Thus, the demand 260 is re-identified 510, and tested whether any other supply is required 470 for demand 260. Again demand 260 does not require any other supply, and the process moves back up to level 1 480. The demand 210 is re-identified 510, and tested whether any other supply is required 470 for demand 210. Again demand 210 does not require any other supply 470. However, there is no higher level 480 490, and therefore the process is done 500.

In another embodiment of the present invention, a reservation system is maintained by updating the information about a reservation. Thus, as a demand gets sourced, fulfilled, the reservation gets updated. For example, any time a supply that was pending, for example an intangible supply represented by a requisition, becomes a true supply, for example real inventory, the event triggers a transfer of the reservation from the intangible supply source to the actual supply source. Or any time a pending work order or assembly job becomes a true supply, such as a product, the event triggers a transfer of the reservation from intangible supply source, represented by the work order, to an actual supply source, represented by a finished good in inventory. The process concludes when the originating demand, for example a customer order, is satisfied, product shipped. The information about the satisfied reservations can then be saved as a historic transaction in a history table.

The historic transaction can contain information related to the source of demand and source of supply. For example, the historic transaction may contain information about the transaction type, the item, the quantity, identity of the source of demand, identity of the source of supply, availability, time needed, lead time, expected delivery, special requirements, and the like. The historic transaction can also accumulate the entire supply chain history, from the end order to the lowest material supplier. Thus, the historic transaction can contain all the information that has happened to the article.

The reservation can be utilized to reduce or eliminate contentions. The reservation between a demand and a supply can also be utilized to schedule tasks and materials.

The reservation system also provides a complete mapping, an end-to-end pegging scenario, of the supply chain as material moves through the manufacturers system. The user can therefore drill down or up at any place in the mapping and obtain complete visibility of the supply chain.

The reservation system can also allow integration of the supply chain across separate organizations. The reservations can be created and updated by various organizations, by opening the reservation system via portal technology, electronic notification, exchange based products, and the like, which allow the various organizations to input information into the reservation system.

Figure 5:
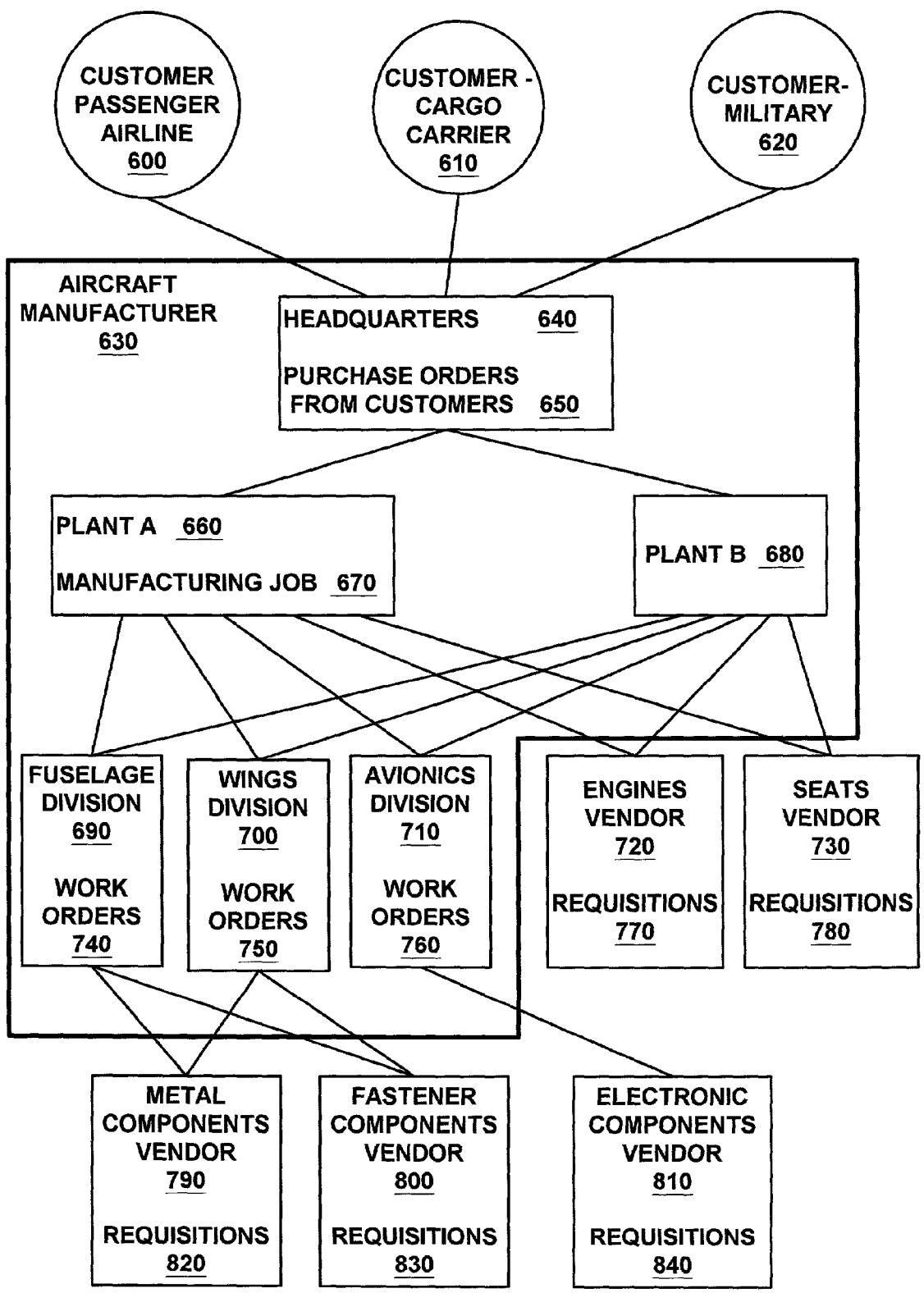
FIG. 5 shows a diagram of a supply chain reservation system applied in a manufacturing example, in accordance with an alternative embodiment of the present invention.

A first example of modeling a supply chain, in accordance with one embodiment of the present invention, is now described. As shown in FIG. 5, an aircraft manufacturer 630 receives demand orders 650 for planes from various customers 600, 610, 620. For example a demand order 650 received from a first passenger airline 600 may be for a model X plane. A demand order 650 received from a cargo carrier 610 may be for a model X plane without seats. While a demand order 650 received from a military 620 may be for a model Y plane without seats, and with radiation hardened electronic components.

The headquarters 640 of the aircraft manufacturer receives and enters the various demand orders 650 into a reservation system, in accordance with an embodiment of the present invention. Headquarters 640 issues a manufacturing job order to the appropriate final assembly plant. For example, a manufacturing job order is issued for a model X plane. The demand orders 650 are modeled as intangible sources of demand. While the manufacturing job 670 is modeled as an intangible source of supply for the demand. A reservation is created linking the manufacturing job 670 to the demand order 650.

Upon receipt of the manufacturing job order 670 for a model X plane, plant A 660 issues various work orders and requisitions 740, 750, 760, 770, 780, for the various subassemblies needed to manufacture the model X plane. The reservation system models the manufacturing job order 670 as a source of demand for the various sources of supply, represented by the work orders and requisitions 740, 750, 760, 770, 780. Reservations are created linking the various work orders and requisitions 740, 750, 760, 770, 780 to the manufacturing job order 670. For example to produce a model X plane for a passenger airline, the plant will order a fuselage, two wings, three types of avionics equipments, two engines, and two hundred and sixty seats.

Furthermore, upon receipt of the work orders 740, 750, 760 the fuselage division 690, the wings division 700, and avionics division 710 each issue various requisitions 820, 830, 840 for material needed to build the subassemblies. Again the reservation system models the various work orders 740, 750, 760 as sources of demands for the various sources of supply, represented by the requisitions 820, 830, 840. Reservations are created linking the various requisitions 820, 830, 840 to their respective work orders 740, 750, 760.

Furthermore, the reservation system can also model the supply chain within each division. For example, the supply chain for fuselage division can be modeled by the demand for a sub-assembly. The supply for this demand is a production job. The production job also constitutes a demand for the material used to build the sub-assembly. Therefore, the production job creates a demand for a source of supply, the material. The source of supply, the material, is represented by the requisition for the material from the appropriate material vendor.

In building aircraft timing is an important consideration. For example it is very important that the sub assemblies arrive at the final assembly plant in the order that they are needed. The subassemblies are too large to store and are to costly to have laying around. Furthermore, each type of subassembly has different lead times to manufacturer. The reservation between the manufacturing job 670 and the various work orders and requisitions 740, 750, 760, 770, 780 can be utilized to schedule the various delivery dates of the various subassemblies so that each supply along the supply chain is available to be source upon request, and not any sooner. For example, a plane may be assembled by attaching the wings to the fuselage, then installing the avionics and engines, and finally installing the seats. Therefore, the reservations can be utilized to schedule delivery of the fuselage first, the wings second, the avionics and engines at the same time, and the seats fourth.

The reservations can also provide the ability to eliminate contentions. For example the model X and model Y planes may both use the same engines. The manufacturer may place an order for six engines, two to build a model X plane (say requisition #1), two to build a model Y plane (say requisition #2), and two to fill an order for spare parts (and say requisition #3). However, the manufacturer may only receive five engines from the engines vendor. The reservations identify which requisition for which manufacturing job the engines are for. For example, the packing slip for the five engines may indicate that two engines fill requisition #1, two engines fill requisition #2, and one engine is a partial shipment under requisition #3. Thus, the reservations clearly identify which manufacturing jobs the engines are for, and that the spare parts order cannot be sourced yet.

The reservation also provides the ability to identify special requirements. For example, the electronic components used in the avionics may be identical in function. However the components used to build the avionics built for the military, require that they be radiation hardened. The reservation can allow this requirement to be utilized to further identify the supply and the demand that the item sources.

Figure 6:
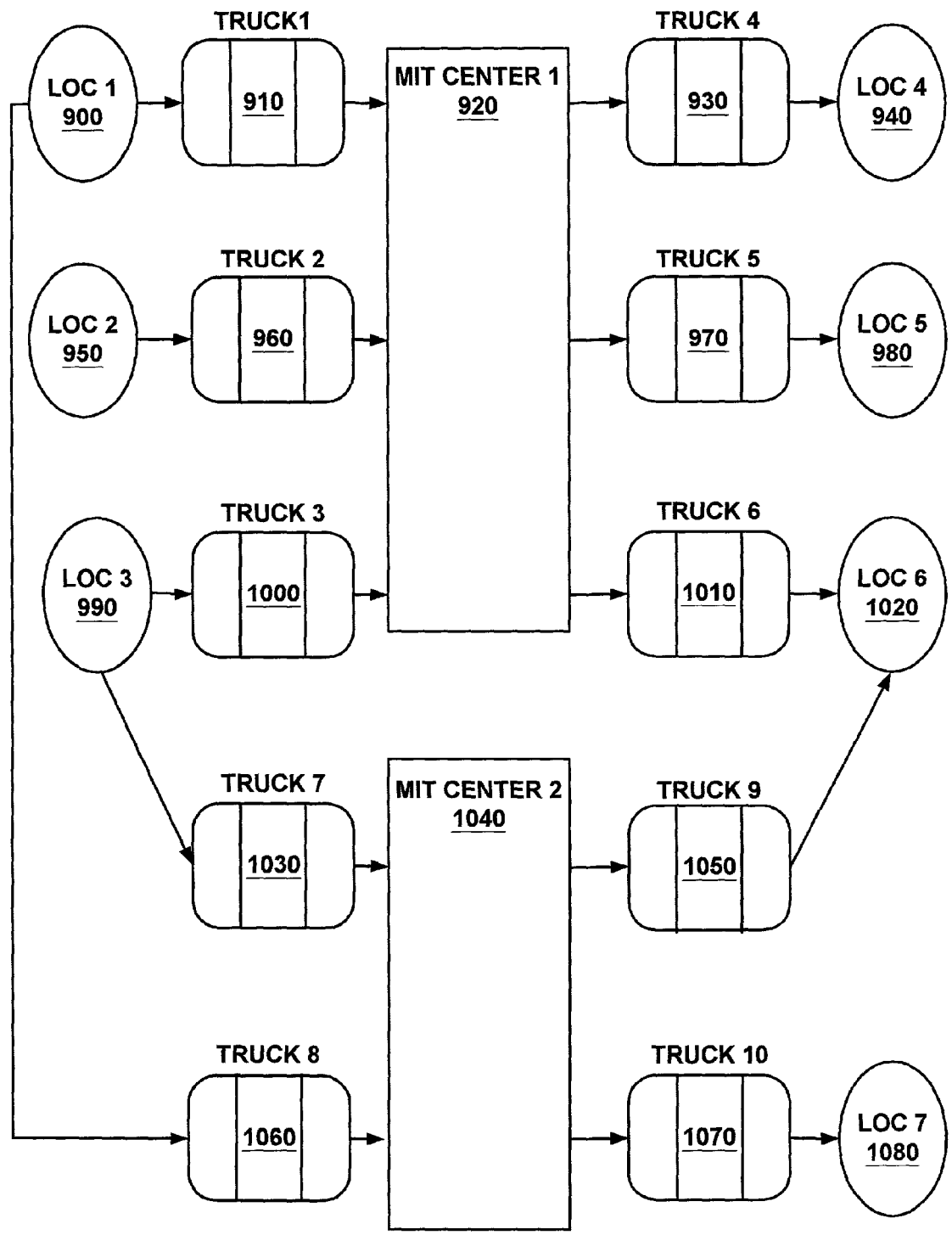
FIG. 6 shows a diagram of a supply chain reservation system applied in a logistics example, in accordance with an alternative embodiment of the present invention.

A second example of modeling a supply chain, in accordance with one embodiment of the present invention, is now described. A reservation system may also model the supply chain of a logistics organization. As shown in FIG. 6, the logistics organization carries cargo from various locations 900, 950, 990 to one or more of its merge-in-transit (MIT) centers 920, 1040. The cargo is redistributed from arriving trucks 910, 960, 1000, 1030, 1060 on to departing trucks 930, 970, 1010, 1050, 1070. The departing trucks 930, 970, 1010, 1050, 1070 carry the cargo to various final destinations 940, 980, 1020, 1080. The logistics organization may have a finite number of trucks, each with limited cargo carrying capacity. The cargo may also have various restrictions concerning delivery times. The routes between locations may also establish preferred MIT centers for use by each originating and destination location.

The reservation system begins by modeling the destination locations 940, 980, 1020, 1080 as demands. Various trucks 930, 970, 1010, 1050, 1070 are modeled as supplies. The reservation system checks to see if one or more trucks 930, 970, 1010, 1050, 1070 are available, and then attaches a reservation linking the demand, the destination location (for example 1020), with the source of supply, an available truck (for example 1010).

The truck 1010 then becomes a demand. The MIT centers 920 1040 are modeled as supplies. The reservation system checks to see if one or more MIT centers 920 1040 are available, and then attaches a reservation linking the demand, the truck 1010, with the source of supply, an available MIT center (for example 920).

The MIT center 920 then becomes a demand. Various trucks 910, 960, 1000, 1030, 1060 are modeled as supplies. The reservation system checks to see if one or more trucks 910, 960, 1000, 1030, 1060 are available, and then attaches a reservation linking the demand, the MIT center 920, with the source of supply, an available truck (for example 910).

The truck 910 then becomes a demand. Various locations 900, 950, 990 are modeled as supplies. The reservation system checks to see if one or more locations 900, 950, 990 are available, and then places a reservation linking the demand, the truck 910, with the source of supply, an available location (for example 900).

The above example illustrates how the reservation system can model the supply chain necessary to get a package from an originating location 900 to a desired destination location 1020. To handle competing demands with differing requirements, for example multiple lots of cargo with various delivery requirements such as express and normal delivery, it may be desirable for the reservation system to be able to first prioritize various demands before sources of supply are identified and reserved. Furthermore, to accommodate preferred routings, it may be desirable for the reservation system to be able to order the possible sources of supply by preference. Such characteristics of the reservation system can provide for complete modeling of the supply chain, and optimum performance thereof.

Figure 7:
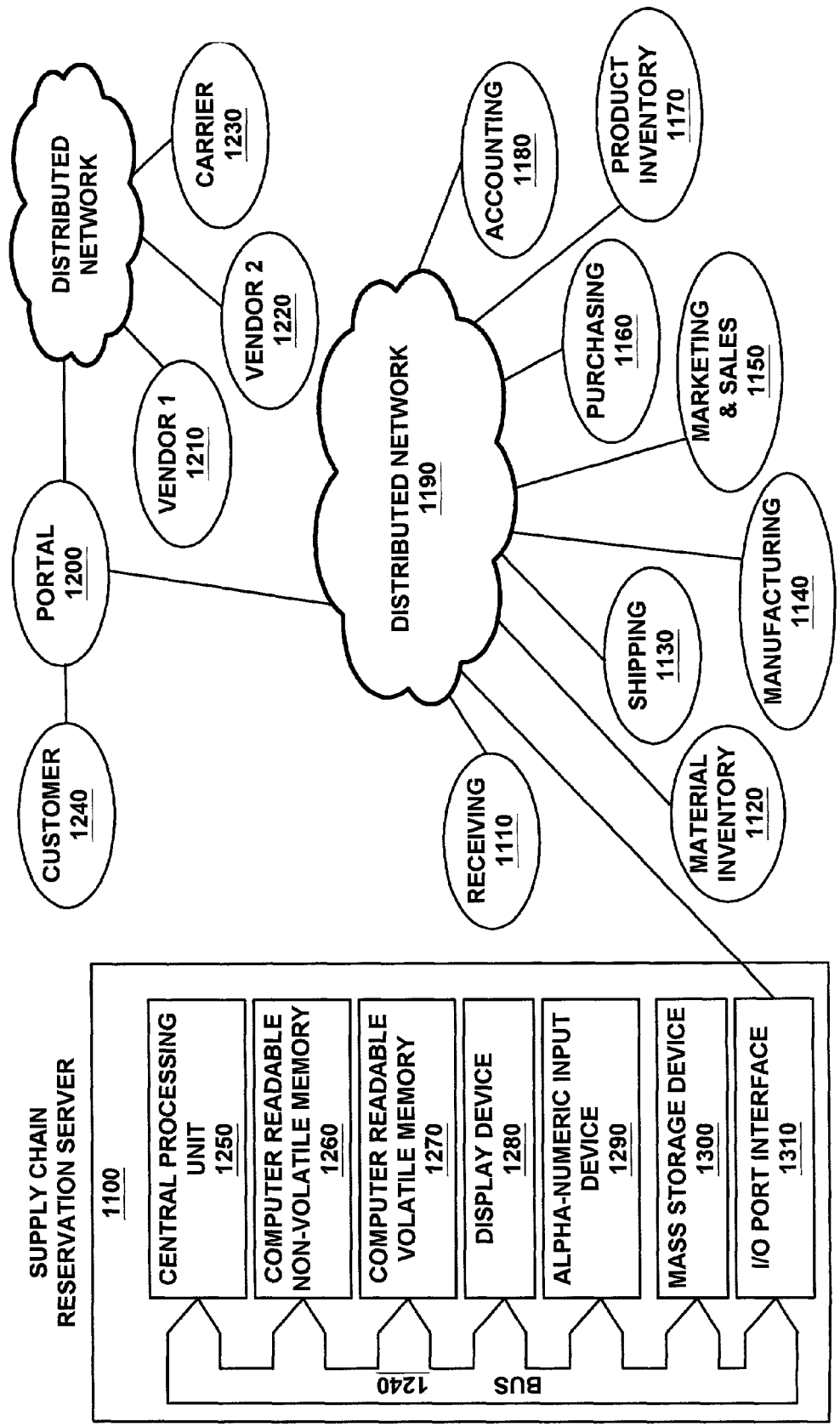
FIG. 7 shows a diagram of a computer system platform in accordance with one embodiment of the present invention.

FIG. 7 shows a diagram of a computer platform for implementing a supply chain reservation system in accordance with one embodiment of the present invention. As depicted in FIG. 7, a supply chain reservation server 1100 functions as the host for modeling the supply chain. The supply chain reservation server 1100 receives transactions from various users 1110, 1120, 1130, 1140, 1150, 1160, 1170, 1180, such as receiving, shipping, material inventory, manufacturing, marketing and sales, purchasing, product inventory, accounting, and the like. Furthermore, additional users can be connected via portal technology 1200, electronic notification, exchange based products, and the like.

The supply chain reservation system is implement, for example, by using a database program running on the supply chain reservation server 1100. The users 1110, 1120, 1130, 1140, 1150, 1160, 1170, 1180, 1210, 1220, 1230, 1240 are connected to the supply chain reservation server via a distributed network, such as a LAN, WAN, ethernet, internet, or the like.

In general, the supply chain reservation server 1100 shows the basic component of a computer system used to implement the supply chain reservation system. The server 1100 comprises an address/data bus 1240 for communicating information, one or more central processing units 1250 coupled with the bus 1240 for processing information and instructions, a computer readable volatile memory unit 1260 (e.g. random access memory, static RAM, dynamic RAN, etc.) couple with the bus 1240 for storing information and instruction for the central processor(s) 1250, a computer readable non-volatile memory unit 1270 (e.g, read only memory, programmed ROM, flash memory, EPROM, EEPROM, etc.) coupled with the bus 1240 for storing static information and instructions for the processor(s) 1250. The server 1100 also includes a mass storage computer readable data storage device 1300 such as magnetic or optical disk and disk drive coupled with the bus 1240 for storing information and instructions. Optionally, the server 1100 can include a display device 1280 coupled to the bus 1240 for displaying information to the computer user, an alphanumeric input device 1290 for communicating information and command selections to the central processor(s) 1250, and a input/output port interface 1310 coupled to the bus 1240 for communicating information and command selections between the distributed network 1190 to the processor(s) 1250.

The supply chain reservation server models one or more supply chain transactions as a source of demand and or a source of supply. Upon identifying the demand and an appropriate supply for satisfying the demand, the supply chain server attaches a reservation.

As systems become more collaborative, and as the concept of internal and external blur, the concept of a reservation as being something that has an independent existence becomes important. A reservation, in accordance with the present invention, becomes a business object that can be utilized to model a supply chain. Reservations can be utilized to take action and make decision at each node in the supply chain. The present invention, abstracts out the concept of supply and demand, linking them with a reservation, and creates rules of how reservations behave, so that reservations can be utilized to manage allocations. Managing allocations can entail eliminating contentions, scheduling tasks and materials, and the like. Hence, a reservation is a business objects for managing allocations across a supply chain.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A computer implemented method for managing a supply chain, comprising:
   receiving a first demand at a computer system;
   determining, by a processor of the computer system, a first source of a first supply for satisfying the first demand;
   creating, by the processor of the computer system, a first reservation linking the first supply from the first source to the first demand, the first reservation reserving the first supply to the first demand;
   responsive to the first supply being unavailable:
      setting, by the processor of the computer system, a status of the first reservation to indicate that the first demand is unsatisfied;
      creating, by the processor of the computer system, a second reservation linking a second demand to a requisition for the second supply;
      identifying, by the processor of the computer system, a second source of a second supply that satisfies the second demand;
      responsive to identifying the second source that satisfies the second demand, setting, by the processor of the computer system, a status of the second reservation to indicate that the second source satisfies the second demand; and
      responsive to the status of the second reservation indicating that the second source satisfies the second demand, setting, by the processor of the computer system, the status of the first reservation to indicate that the first source satisfies the first demand.

2. The method as recited in claim 1 wherein the first demand requires more than one supply, further performing each of said steps of creating, identifying, and setting for each additional supply required by the first demand.

3. The method as recited in claim 1 wherein there are one or more competing demands, further comprising prioritizing, by the processor of the computer system, the competing demands.

4. The method as recited in claim 1 wherein there are one or more sources of the first supply, further comprising preferencing, by the processor of the computer system, the sources.

5. The method as recited in claim 1, further comprising:
   receiving, by the processor of the computer system, information concerning the status of the supply chain transaction; and
   updating, by the processor of the computer system, the first reservation based upon the status of the supply chain transaction.

6. The method as recited in claim 1, wherein the first reservation and the second reservation provide traceability of the supply chain.

7. The method as recited in claim 1, wherein:
   the first supply comprises a first item or a first service; and
   the second supply comprises a second item or a second service.

8. The method as recited in claim 1, wherein the first reservation contains information concerning the first demand.

9. The method as recited in claim 8, further comprising updating, by the processor of the computer system, the information contained in the first reservation in response to a change of status of the first demand.

10. The method as recited in claim 9, wherein the first reservation contains information concerning the first supply.

11. The method as recited in claim 10, further comprising updating, by the processor of the computer system, the information contained in the first reservation in response to a change of status of the first supply.

12. The method as recited in claim 1, wherein the first demand and second demand are not parts of the same demand.

13. The method as recited in claim 1, wherein sequentially the second source of the second supply satisfies the second demand making the first source of the first supply available so that the first source of the first supply satisfies the first demand.

14. The method as recited in claim 1, wherein the first source of the first supply comprises a work order.

15. The method as recited in claim 1, wherein the first source of the first supply comprises a requisition.

16. The method as recited in claim 1, wherein the second source of the second supply comprises a work order.

17. The method as recited in claim 1, wherein the first demand comprises a work order.

18. The method as recited in claim 1, wherein the status of the first reservation is set to indicate that the first demand is unsatisfied based upon the first source being an intangible source of supply.

19. The method as recited in claim 1, wherein determining that the second source satisfies the second demand further comprises determining, by the processor of the computer system, that the second source is an actual source of supply.

20. A non-transitory computer-readable medium for a computer system, the non-transitory computer-readable medium having stored thereon a series of instructions executable by a processor to manage allocation in a supply chain, the series of instructions comprising:
   instructions that cause the processor to receive a first demand;
   instructions that cause the processor to determine a first source of a first supply for satisfying the first demand;

instructions that cause the processor to create a first reservation linking the first demand and the first supply from the first source, the first reservation reserving the first supply to the first demand;

instructions that, responsive to the first supply being unavailable:
- cause the processor to set a status of the first reservation to indicate that the first demand is unsatisfied;
- cause the processor to create a second reservation linking a second demand to a requisition for the second supply from the second source;
- cause the processor to identify a second source of a second supply that satisfies the second demand;
- cause the processor to, responsive to identifying the second source that satisfies the second demand, set a status of the second reservation to indicate that the second source satisfies the second demand; and
- cause the processor to, responsive to the status of the second reservation indicating that the second source satisfies the second demand, set the status of the first reservation to indicate that the first source satisfies the first demand.

21. The non-transitory computer-readable medium as recited in claim 20, further comprising:
instructions that cause the processor to receive information concerning the status of the supply chain transaction; and
instructions that cause the processor to update the first reservation based upon the status of the supply chain transaction.

22. The non-transitory computer-readable medium as recited in claim 20, further comprising instructions that cause the processor to provide traceability of the supply chain transaction.

23. The non-transitory computer-readable medium as recited in claim 20, wherein:
the first supply comprises a first item or a first service; and
the second supply comprises a second item or a second service.

24. The non-transitory computer-readable medium as recited in claim 20, wherein the first reservation contains information concerning the first demand.

25. The non-transitory computer-readable medium as recited in claim 24, further comprising instructions that cause the processor to update the information contained in the first reservation in response to a change of status of the first demand.

26. The non-transitory computer-readable medium as recited in claim 20, wherein the first reservation contains information concerning the first supply.

27. The non-transitory computer-readable medium as recited in claim 26, further comprising instructions that cause the processor to update the information contained in the first reservation in response to a change of status of the first supply.

28. The non-transitory computer-readable medium as recited in claim 20, wherein said first reservation reduces contention for the first supply from the first source.

29. A computer implemented method of modeling a supply chain, the method comprising:
by a computer system, determining each demand;
by the computer system, determining each source of supply for each demand, wherein a source of supply is also a second demand when the source of supply is not available and satisfaction of each second demand causes the corresponding source of supply to be available to satisfy the corresponding demand;
creating, by the computer system, a reservation between each source of supply and each corresponding demand and storing said reservation in a memory of the computer, each reservation including a status that indicates whether the source of supply linked by the reservation satisfies the demand linked by the reservation;
responsive to the status of each demand linked by one or more reservations to a prior demand indicating that the demand is satisfied, setting, by the computer system, the status of a reservation linked directly to the prior demand to indicate that the prior demand is satisfied.

30. The method as recited in claim 29, wherein the reservations transfer along the model of supply chain as corresponding supplies are allocated to corresponding demands.

31. The method as recited in claim 30, wherein information contained in the reservations is updated in response to changes in the demands and supplies.

32. The method as recited in claim 31, wherein the reservations are saved as a transaction history.

33. The method as recited in claim 29, wherein the reservations provide an end-to-end mapping of the supply chain.

34. The method as recited in claim 29, wherein the reservation comprises a business object stored in the memory of the computer system.

* * * * *

UNITED STATES PATENT AND TRADEMARK OFFICE
CERTIFICATE OF CORRECTION

| | | |
|---|---|---|
| PATENT NO. | : 8,170,899 B2 | |
| APPLICATION NO. | : 10/158175 | |
| DATED | : May 1, 2012 | |
| INVENTOR(S) | : Chorley et al. | |

It is certified that error appears in the above-identified patent and that said Letters Patent is hereby corrected as shown below:

In column 3, line 9, delete "bellow." and insert -- below. --, therefor.

In column 3, line 47, delete "and or" and insert -- and/or --, therefor.

In column 6, line 64, delete "to costly" and insert -- too costly --, therefor.

In column 9, line 2, delete "and or" and insert -- and/or --, therefor.

Signed and Sealed this
Thirty-first Day of July, 2012

David J. Kappos
*Director of the United States Patent and Trademark Office*